United States Patent [19]

Grudinin et al.

[11] Patent Number: 4,481,072
[45] Date of Patent: Nov. 6, 1984

[54] METHOD FOR RECOVERY OF WASTEWATER RESIDUES

[75] Inventors: Vladimir P. Grudinin, Amursk; Boris M. Bukhteev; Tatyana V. Dergunova, both of Leningrad, all of U.S.S.R.

[73] Assignee: Vsesojuznoe Nauchno-Proizvodstven Noe Obiedinenie Tselljulozno-Bumazhnoi Promyshlennosti, Leningrad, U.S.S.R.

[21] Appl. No.: 410,162

[22] Filed: Aug. 20, 1982

Related U.S. Application Data

[63] Continuation of Ser. No. 209,785, Nov. 24, 1980, abandoned.

[30] Foreign Application Priority Data

Dec. 3, 1979 [SU] U.S.S.R. ............................... 2847164

[51] Int. Cl.³ .............................................. D21C 11/04
[52] U.S. Cl. ................... 162/16; 162/30.11; 162/35; 162/37; 162/38; 162/DIG. 9; 210/737; 210/928
[58] Field of Search ............... 162/DIG. 9, 16, 30.1, 162/29, 30.11, 38, 45, 35, 82, 37; 210/609, 631, 768, 770, 804, 928, 774, 766, 737

[56] References Cited

U.S. PATENT DOCUMENTS 3,841,962 10/1974 Procter et al. ........................ 162/82
4,256,630 3/1981 Fremont .............................. 210/928

FOREIGN PATENT DOCUMENTS 536268 11/1976 U.S.S.R. .
557055 7/1977 U.S.S.R. .............................. 210/928

OTHER PUBLICATIONS

Obst et al, "Effect of Quinones and Amines on the Cleavage Rate of β—O-4 ethers in Lignin During Alkaline Pulping"; TAPPI, Jul. 1980, p. 111.

Primary Examiner—Steve Alvo
Attorney, Agent, or Firm—Ladas & Parry

[57] ABSTRACT

A method for recovery of wastewater residues containing the activated sludge biomass, fibre and bark comprising the steps of treating these with alkali solution having a concentration of 5-80 g/l on the $Na_2O$ basis at a temperature of 20°–70° C. and dewatering the reaction mixture obtained, the alkali filtrate decanted containing the activated sludge alkali hydrolysis products being used to dissolve the melt in the course of preparing the alkali pulping liquor, and the dewatered alkali mass being added, in an amount of up to 40 percent by mass, to the fibred mass composition for the manufacture of cardboard and wood-fibre board.

2 Claims, 1 Drawing Figure

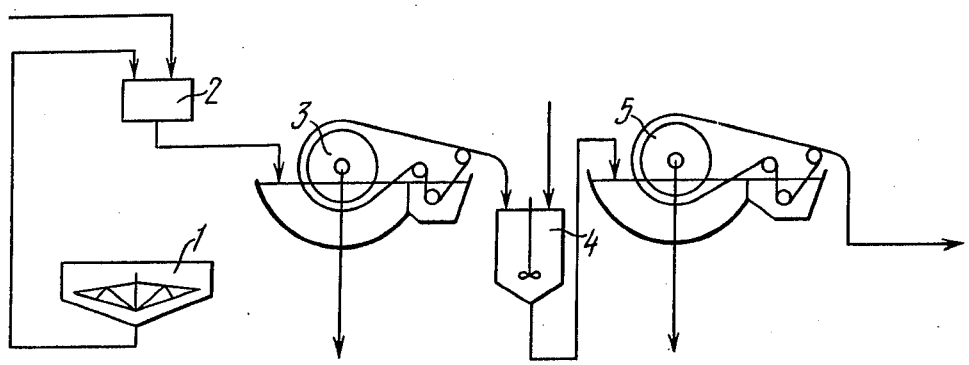

METHOD FOR RECOVERY OF WASTEWATER RESIDUES

This is a continuation of application Ser. No. 209,785, filed Nov. 24, 1980, now abandoned.

FIELD OF THE INVENTION

The present invention relates to the pulp and paper industry and more specifically to methods for recovery of wastewater residues. The invention is directed to recovery of wastewater residues whose composition includes waste activated sludge biomass, fibre and ring.

The invention can find an application in the kraft mills provided with a wastewater biological purification system.

BACKGROUND OF THE INVENTION

The pulp and paper industry is one of the biggest industries consuming a great amount of vegetal resources (wood) and water in the course of processing these. Approximately 50 percent of the initial material, after being processed, goes to wastes, liquid and solid ones. Wastewater amount and its degree of contamination depend on the degree of elaboration of the plant flow diagram. In the pulp and paper industry, wastewater may be subdivided, by the nature of contaminations occurent therein, into lye-containing, acidic, fetid, bark-containing, fibre-containing, and sludge-containing ones. Suspended matters, such as fibre, bark and the like, can be removed mechanically from the sewage, for example in primary sumps. For purification of wastewater from organic contaminations dissolved therein, biological purification is of the highest effectiveness. The gist of the wastewater biological purification process is in consumption of the dissolved organic substances by microorganisms, part of the organic substances being oxidized, part of them being transformed into biomass.

Enabling a deep degree of purification, the wastewater biological purification method, however, entails a penalty of considerable amounts of waste activated sludge formed therewith. The yield of the waste activated sludge constitutes from 160 to 210 grams per cubic meter of the water purified. The waste activated sludge is substantially an amorphous flocculation mass seeded densely with aerobic bacteria and other microorganisms. By its mechanical composition, the activated sludge relates to fine suspensions, 98 percent by weight of which consists of particles less than 1 mm in size. Activated sludge is also characterized by a high water content. It is precisely these features that the complexity of treating the activated sludge mass is accounted for, since a great amount of energy is required to remove the tightly bound. Moreover, decantation of the sludge by filtration methods fails to provide complete dewatering and results in filter stopage, which in turn entails the necessity of periodical restoration of the filtering capability of the strainers. Disposal of the activated sludge into natural basins in that form which it takes at the purification stations is not allowable since this would result in silting of the basins and disturbance of natural processes occurring therein. Because of this, attempts have been made to develop methods for treating waste activated sludge in a way promoting its utilization.

Fibre- and bark-containing wastewater are another sources furnishing the pulp and paper production sewage with the residues. Fibre-containing wastewater is issued when manufacturing half-finished products, paper, cardboard and wood-fibre board. Removal of the fibre-containing sewage by dilution is not allowable since the fibre decomposition results in basin pollution. Bark-containing sewage is issued upon wet peeling. When ingressed in natural basins, the rind can form benthal deposits which are inimical to aquatic life. In consequence fibre- and bark-containing wastewater is to be purified and the residues consisting of fibre and bark are to be eliminated.

There is known a number of methods for recovery of wastewater residues followed by utilization of these in the manufacture of products at the pulp and paper mills. Among these methods is utilization of the slurry-lignine formed upon biological purification of wastewater as a filler, in an amount of 0.6–15 mass percent by absolutely dry basis, when manufacturing packing material (Cf. USSR Inventor's Certificate No. 503,967, Int. Cl. D21H 3/00, D21D 3/00, issued Feb. 25, 1976).

According to USSR Inventor's Certificate No. 440,468 (Int. Cl. D21H 3/00, issued Jan. 31, 1975) raw activated sludge in an amount of up to 20 mass percent by absolutely dry basis is introduced into the whole stuff for manufacturing of packing board.

Utilization of raw activated sludge in this composition of the stocks results in an increased flow rate of steam in the pressing portion of the paper machine because of the necessity of removal of the tightly bound moisture contained in the activated sludge and, consequently, utilization of the activated sludge biomass in operating conditions doesn't exceed 3 percent and constitute 13 kg per ton of the products.

According to USSR Inventor's Certificate No. 536,268 (Int. Cl. D21C 1/00, D21C 3/02, issued Mar. 4, 1977), wood chips are held, before pulping, in an activated sludge suspension. Such a treatment leads to an increased yield of the pulp and improved mechanical properties of the latter. Analogous results are obtained when using activated sludge biomass directly for puling instead of a portion or the whole amount of the black liquor (Cf. Bukhteev B. M., Ishkhanov V. A., Grudinin V. P., Dergunova T. V. "Ispolzovanie izbytochnogo aktivnogo ila v tekhnologii proizvodstva sulfatnoy tselulozy". Referativnajy informatsija "Tseluloza, bumaga i karton", 1979, No. 15, pp. 3–4).

Sulfate pulping (kraft process) is carried out in strong white liquor admixed with black liquor. Strong white liquor is prepared in the following way. After pulping, waste black liquor goes for combustion, in the course of which the organic portion of the black liquor is burnt out, and the mineral portion—sodium salts—forms the melt. The principal components of the melt are sodium carbonate ($Na_2CO_3$) and sodium sulfide ($Na_2S$). The melt is then dissolved in weak white liquor resulting upon washing the white slurry, the solution of melt in weak white liquor being referred to as green liquor. The principal component of green liquor—sodium carbonate—represents a non-active reagent in the sulfate pulping of wood and, because of this, the sodium carbonate is converted to an active pulping reagent—sodium hydroxide—i.e. causticization is effected. The causticization is carried out by adding to the green liquor sufficient lime, the causticization process resulting in the formation of strong white liquor and white slurry ($CaCO_3$). The strong white liquor, which is substantially a mixture of NaOH and $Na_2S$, is used in the pulping.

Thus, the substitution of the waste activated sludge for a portion or all of the black liquor fails to utilize, in kraft process, all the waste sludge collecting at the purification stations.

There is known a method for the elimination of wastewater residues by disposal of the previously dewatered and dried residue to a refuse tip. Such a method for the elimination of wastewater residues involves the erection of new residue storage facilities as the existing ones become filled, which, in turn, requires more area. Additionally, the residue storage facilities exert adverse condition in the area, from the viewpoint of the environmental protection. Because of this, methods for the elimination of wastewater residues comprising dewatering, drying and incineration of these are preferably used.

Known in the art is a method for the elimination of wastewater residues, in particular, of waste activated sludge, comprising its coagulation by iron chloride solution and lime milk followed by dewatering in vacuum filters, drying, and incineration (Cf. Jakovleva O. I., Tkatchenko N. I. "Otchistka stotchnyh vod", "Lesnaja promyshlennost" Publishers, Moscow, 1975, pp. 40–42).

The method is implemented as follows. In a sludge packer, the waste activated sludge biomass is mixed, in a ratio of 1:1 or 1:2, with the residue from the primary sumps consisting of fibre and bark. To achieve coagulation of the residue, it is treated with iron chloride and lime milk. The residue is then dewatered in vacuum filters, preferably in ones with descending plate of the filtering fabric. The dewatered residue is removed from the plate of the vacuum filter with a special knife or it is blown with compressed air. The dewatered residue having a humidity of 83–85 percent is subjected to thermal drying in drying drums at a temperature of 500°–800° C. The dried residue having a humidity of 20–40 percent is incinerated. The elimination of wastewater residues by said method involves the erection of thermal drying and incineration shops that consume much energy. Moreover, the filtrate decanted upon dewatering the precoagulated residue and discharged on the purification structure contains toxic compounds of iron and calcium, which influences adversely the process of biological purification of wastewater. Dewatering of the residue in the vacuum filters is accompanied by clogging of the filtering plate which impairs its filtering capability. To restore the filter plate, it must be continuously washed through the sprinkling system and periodically rinsed with inhibited muriatic acid.

SUMMARY OF THE INVENTION

It is an object of the present invention to provide recovery of wastewater residues containing the waste activated sludge biomass, fibre and bark followed by utilizing these in the main processes of the pulp and paper production, thereby providing a low-waste plant flow diagram.

It is another object of the present invention to cut down energy consumption for the treatment of wastewater residues by elimination of the drying and incineration procedures.

With these and other objects of the present invention in view, there is provided a method for recovery of wastewater residues containing the activated sludge biomass, fibre and bark comprising the steps of treating these with chemical reagents and dewatering followed by thermal treatment of the products obtained, wherein, according to the invention, for the chemical reagent for the treatment of the wastewater residues there is used alkali solution having a concentration of 5–80 g/l on the $Na_2O$ basis at a temperature of 20°–70° C., the resulting reaction mixture is then dewatered, the alkali filtrate decanted containing the activated sludge alkali hydrolysis products being used to dissolve the melt in the course of the preparation of the alkali pulping liquor, and the dewatered alkali mass is added, in an amount of up to 40 percent by mass, to the fibred mass composition for the production of cardboard and wood-fibreboard.

In the wastewater biological purification system, the part of bioxidants is played by a population of microorganisms (biocenosis) including bacteria, protozoa, and also water-plants, mushrooms, i.e. the activated sludge. Practically, there is no such a matter of organic origin that couldn't be oxidized by microorganicms. Sewage of the pulp and paper production is characterized by a great variety of the contaminants, which accounts for the diversity of the activated sludge microflora composition used on the purification stations of an enterprise. The major part in biocenosis is played by bacteria whose amount may be as great as $10^{14}$ cells per each gram of the dry biomass. In the course of their activity, the microorganisms consume the organics of the wastewater, propagate themselves, thus forming te waste activated sludge. The active sludge biomass is characterized by a high protein content (from 30 to 50 percent by mass) that is hydrolyzed, under action of the alkali, to form amino-derivatives influencing favourably the pulping processes. This enables to use the alkali liquors of the activated sludge biomass in the course of the preparation of the strong white liquor of the kraft process by forwarding these to the dissolution of the melt.

In the accordance with the proposed invention, a weak white liquor can be used for the treatment of the wastewater residues containing the waste activated sladge. After such a treatment, the weak liquor enriched with the activated sludge biomass hydrolysis products is used to dissolve the melt followed by the treatment of the green liquor in the conventional way. The alkali pulping liquor obtained by this process is enriched with the activated sludge alkali hydrolysis products which permits to produce pulp of high quality. Treatment of wastewater residues with alkali liquors having a concentration less than 5 g/l on the $Na_2O$ basis is inexpedient since it would entail an increase in temperature and time required for the activated sludge biomass hydrolysis reactions to proceed. The use of alkali liquors with a concentration above 80 g/l on the $Na_2O$ basis is also inexpedient since it would result in an increased degree of hydrolysis of the activated sludge biomass.

The alkali mass (after dewatering) is added, in an amount of 40 percent by mass, to the composition for the manufacture of cardboard and wood-fibre board. The alkali mass consists of fibre and bark admixed with the nonhydrolyzed activated sludge and the products of the alkali hydrolysis thereof. Addition of the alkali mass in an amount over than 40 percent by mass in the composition for the manufacture of cardboard is inexpedient since it would entail a decrease in the physical-mechanical factors of the resulting product.

In the production of paper, cardboard of various kinds and wood-fibre board, there is used fibred initial material of vegetal origin. The fibred initial material in turn results from the pulping of cellulose-containing vegetal resources. The pulping is aimed to extract lignine from the fibres. Depending on the kind of products to be manufactured at the mill, pulp of various degree of delignification is produced, this influencing its physical-mechanical factors. The possibility for replacing a portion of the fibred material with the fibre removed from the wastewater enables to cut down the consumption of fibred initial material of the vegetal origin, the quality of the resulting products being the same or even higher.

Moreover, the use, in the cardboard and wood-fibre board composition, of the fibre removed from wastewater permits to solve the problem of its utilization by forwarding it back to the main production cycle.

It is preferable to use white sulfate liquor for the chemical reagent for the treatment of wastewater residues. Two kinds of white sulfate liquors are available. The strong white liquor is used for pulping vegetal sources in kraft process. The weak white liquor obtained upon washing the white slurry is forwarded for dissolving the melt in the course of the preparation of the strong white liquor. White slurry is washed at a temperature of 60-80° C. Therefore, at the kraft mills having a system for the regeneration of chemicals, there is always available an alkali liquor having a temperature of 60°-80° C., i.e. the weak white liquor. According to the present invention, wastewater residues containing in their composition waste activated sludge, fibre and bark are treated with the weak white liquor before it is forwarded for dissolving the melt. Thus, to dissolve the melt, weak white liquor is fed containing the products of hydrolysis of the activated sludge biomass. The utilization of the weak white liquor for treating wastewater residues, the liquor having a temperature of 60°-80° C. and being available directly at the mill, generates no need for its heating.

DETAILED DESCRIPTION OF THE INVENTION

The gist of the invention is in the following. Sewage containing the waste activated sludge biomass is mixed, in a ratio of 1:1 or 1:2, with sewage containing fibre and bark. The mixture is dewatered, for example, in a vacuum filter. The dewatered mass is treated with alkali solution having a concentration of 5-80 g/l on the $Na_2O$ basis at a temperature of 20°-80° C. The treatment is carried out in a mixer into which the dewatered mass and alkali liquor are fed. Depending on the temperature and concentration, the treatment lasts from 5 to 60 min. Hydrolysis of the activated sludge biomass effected under the action of the alkali results in the trasition of the activated sludge alkali hydrolysis products into solution. Degree of hydrolysis of the activated sludge biomass amounts, depending on the temperature and concentration of the alkali liquor, from 50 to 95.6 percent. Upon the following vacuum-filtration of the reaction mixture, its separation into liquid and solid phases occurs. The liquid phase in the form of alkali filtrate containing the activated sludge alkali hydrolysis products is used for dissolving the melt in the course of preparing the alkali pulping liquor of the kraft process. The solid phase in the form of an alkali mass consisting of fibre, rind and nonhydrolized activated sludge admixed with the activated sludge hydrolysis products is added, in an amount of up to 40 percent, to the fibred mass composition for the manufacture of cardboard and wood-fibre board.

DETAILED DESCRIPTION OF THE PREFERRED EMBODIMENT

Referring to FIG. 1, there is shown a version of the plant flow diagram for the implementation of the proposed method for recovery of wastewater residues.

From a sump 1, the waste activated sludge is forwarded to a mixer 2, the sewage containing fibre and rind are fed there too. The ratio of the sewages is 1:1. The mixture is then dewatered in a vacuum filter, preferably in one with a descending plate. The filtrate decanted from the vacuum filter 3 is forwarded for washing the pulp or discharged on the purification structures. The dewatered layer of the residue is loaded into an agitator 4 where the alkali colution with a concentration of 5-80 g/l on the $Na_2O$ basis is supplied. The agitator 4 is substantially a container provided with a stirrer and openings: in the upper portion—for loading of the dewatered residue and alkali solution; in the bottom portion—for removing the reaction alkali suspension. In the agitator 4 alkali hydrolysis of the activated sludge biomass occurs. The suspension thus obtained and consisting of the alkali solution containing the activated sludge alkali hydrolysis products (liquid phase) and the solid phase in the form of fibre, rind and a portion of nonhydrolyzed sludge is separated in a vacuum filter 5. The alkali filtrate decanted from the vacuum filter 5 is used for dissolving the melt in the course of preparing the alkali pulping liquor of the kraft process, and the dewatering alkali mass is added to the fibred mass when manufacturing carboard and wood-fibre board.

In the course of preparing the fibred mass for the manufacture of cardboard, a sizing means is added thereto as well as a precipitant to fix it on the fibred constitutent, after which the cardboard plate is cast followed its dewatering and drying.

In manufacturing wood-fibre board, paraffin emulsion is added to the prepared fibred mass. A plate is then formed from the mass thus prepared, followed by its pressing and heating.

Thus, the proposed invention enables a low-waste plant flow diagram at the pulp and paper enterprises by utilization of the wastewater residues in the main production process and, at the same time, cuts down the fresh water consumption per each ton of the resulting products. In manufacturing cardboard and wood-fibre board, the proposed invention will help to reduce the consumption of fibred initial material of vegetal origin and, at the same time, to increase the output. Elimination of the procedures of thermal drying and incineration of the residues results in a decreased energy outlay. Commercial introduction of the invention will permit to dispense with the use of the non-regenerative and toxic reagents hitherto employed for the coagulation of residues.

EXAMPLE 1

Waste activated sludge removed from the sump 1 was mixed, in a ratio of 1:1, in the mixer 2 with the residue from the primary sumps consisting of fibre and bark. Immediately after the mixing, the mixture was fed in the vacuum filter 3. In the vacuum filter the mixture was dewatered to a humidity of 85 percent. The dewatered residue containing 43 percent by mass of the activated sludge and 57 percent by mass of the fibre and bark was treated in the agitator 4 with alkali solution with a content of the total alkali of 20 g/l on the $Na_2O$ basis. The treatment was carried out at a temperature of 70° C. for 20 minutes. The degree of hydrolysis of the activated sludge biomass for this condition was 95.6 percent (see Table 1). The mixture thus treated was dewatered in the vacuum filter 5 to a humidity of 80 percent. The decanted filtrate with a content of the total alkali of 15.5 g/l on the $Na_2O$ basis was forwarded for dissolving the melt. The alkali mass removed from the plate of the vacuum filter 5 was utilized in the manufacture of cardboard and wood-fibre board.

EXAMPLE 2

Wastewater residues were prepared to the treatment with alkali solution in the same manner as in Example 1. Conditions of the alkali treatment were as follows:

| total alkali content in white liquor | 10 g/l on the $Na_2O$ basis |
|---|---|
| temperature | 70° C. |
| duration | 40 min. |

Under such conditions of the treatment, the degree of hydrolysis of the activated sludge was 76.4 percent. The products obtained upon dewatering the reaction alkali mixture was utilized as in Example 1.

Analysis data obtained in Examples 1 and 2 are given in Table 1.

EXAMPLE 3

Wastewater residues were prepared for treating with alkali solution in the same manner as in Example 1. Conditions of the alkali treatment were as follows:

| concentration of sodium hydrate (NaOH) | 5 g/l on the $Na_2O$ basis |
|---|---|
| temperature | 20° C. |
| duration | 60 min. |

Under said conditions, the degree of hydrolysis of the activated sludge was 50 percent. The products obtained upon dewatering the reaction alkali mixture were utilized as in Example 1.

EXAMPLE 4

Wastewater residues were prepared for treating with alkali solution in the same way as in Example 1. Conditions of the alkali treatment were as follows:

| sodium hydrate concentration | 20 g/l on the $Na_2O$ basis |
|---|---|
| temperature | 20° C. |
| duration | 20 min. |

Under these conditions, the degree of hydrolysis of the activated sludge was 62.3 percent. The products obtained upon the alkali treatment were utilized as in Example 1.

EXAMPLE 5

Wastewater residues were prepared for treating with alkali solution in the same manner as in Example 1. Conditions of the alkali treatment were as follows:

| sodium hydrate concentration | 20 g/l on the $Na_2O$ basis |
|---|---|
| temperature | 60° C. |
| duration | 5 minutes. |

The degree of hydrolysis of the activated sludge was 84.4 percent. The products obtained upon dewatering the alkali reaction mixture were utilized as in Example 1.

EXAMPLE 6

Wastewater residues were prepared for treating with alkali solution as in Example 1. Conditions of the alkali treatment were as follows:

| sodium hydrate concentration | 20 g/l on the $Na_2O$ basis |
|---|---|
| temperature | 60° C. |
| duration | 20 min. |

Under these conditions of the treatment, the degree of hydrolysis of the activated sludge was 87.6 percent. The products obtained upon dewatering the alkali reaction mass were utilized as in Example 1.

EXAMPLE 7

Wastewater residues were prepared for treating with alkali solution in the same manner as in Example 1. Conditions of the alkali treatment were as follows:

| sodium hydrate concentration | 20 g/l on the $Na_2O$ basis |
|---|---|
| temperature | 70° C. |
| duration | 20 min. |

The degree of hydrolysis under these conditions was 93.4 percent. The products obtained upon dewatering the alkali reaction mixture were utilized as in Example 1.

EXAMPLE 8

Wastewater residues were prepared for treating with alkali solution in the same manner as in Example 1. Conditions of the treatment were as follows:

| sodium hydrate concentration | 40 g/l on the $Na_2O$ basis |
|---|---|
| temperature | 20° C. |
| duration | 20 min. |

Under these conditions, the degree of hydrolysis of the activated sludge was 74.6 percent. The products obtained upon dewatering the alkali reaction mixture were utilized as in Example 1.

EXAMPLE 9

Wastewater residues were prepared for treating with alkali solution in the same manner as in Example 1. Conditions of the alkali treatment were as follows:

| sodium hydrate concentration | 80 g/l on the $Na_2O$ basis |
|---|---|
| temperature | 70° C. |
| duration | 5 min. |

The degree of hydrolysis upon said treatment was 80.2 percent. The products obtained upon dewatering the alkali reaction mixture were utilized as in Example 1.

Analysis data obtained in Examples 3 through 9 are given in Table 2.

TABLE 1

| Example No. | Content of total alkali in solution g/l on Na$_2$O basis | Temperature, °C. | Duration of treatment | Degree of hydrolysis of the activated sludge biomass, % |
|---|---|---|---|---|
| 1 | 20 | 70 | 20 | 95.6 |
| 2 | 10 | 70 | 40 | 76.4 |

TABLE 2

| Example No. | Content of total alkali in solution g/l on Na$_2$O basis | Temperature, °C. | Duration of treatment | Degree of hydrolysis of the activated sludge biomass, % |
|---|---|---|---|---|
| 3 | 5 | 70 | 60 | 50.0 |
| 4 | 20 | 20 | 20 | 62.3 |
| 5 | 20 | 60 | 5 | 84.4 |
| 6 | 20 | 60 | 20 | 87.6 |
| 7 | 20 | 70 | 20 | 93.4 |
| 8 | 40 | 20 | 20 | 74.6 |
| 9 | 80 | 70 | 5 | 80.2 |

EXAMPLE 10

Alkali filtrate containing the activated sludge hydrolysis products and utilized in the course of preparing the strong white liquors were obtained in the following manner.

From the sump 1, the waste activated sludge was fed into the mixer 2 where the residue of the primary sumps consisting of fibre and bark was also fed. The ratio of the waste activated sludge to the residue from the primary sumps was 1:1. Immediately after the mixing, the mixture was forwarded to the vacuum filter 3 for dewatering. The residue dewatered to a humidity of 85 percent and containing 43 percent by mass of the activated sludge and 57 percent by mass of fibre and bark was treated in the agitator 4 with white liquor. The content of the total alkali in the white liquor was 20 g/l on the Na$_2$O basis. The temperature of the treatment was 70° C. and duration, 20 minutes. Under these conditions, the degree of hydrolysis of the activated sludge biomass was 95.6 percent. The alkali reaction mixture obtained upon the treatment was dewatered in the vacuum filter 5 to a humidity of 80 percent. The alkali filtrate decanted upon dewatering contained the products of the alkali hydrolysis of the activated sludge. The concentration of the total alkali was 15.5 g/l on the Na$_2$O basis. The melt was dissolved in the alkali filtrate. The green liquor obtained with a content of the total alkali of 125.2 g/l on the Na$_2$O basis, a content of the active alkali of 42.9 g/l and a sulfidation of 28.2 percent was causticized. Conditions of the causticization were as follows:

| temperature | 95° C. |
|---|---|
| duration | 2 h |

The degree of causticization therewith was 80.6 percent. The strong white liquor obtained in the process of casticization had the following factors:

| content of the total alkali | 102.2 g/l on the Na$_2$O basis |
|---|---|
| active alkali content | 98.7 g/l on the Na$_2$O basis |
| sulfiding | 27.9 percent |

EXAMPLE 11

Alkali filtrate containing the activated sludge biomass hydrolysis products was produced in the same manner as in Example 10.

The alkali filtrate and white liquor with a content of the total alkali of 15.5 g/l were fed, in a ratio of 1:1, for dissolving of the melt. Green liquor with a content of the total alkali of 125.2 g/l on the Na$_2$O basis and a sulfidity of 27.7 percent was causticized. Conditions of the causticization were maintained as in Example 10. The causticized efficiency was 80.3 percent, and the strong white liquor had the following factors:

| total alkali content | 101.8 g/l on the Na$_2$O basis |
|---|---|
| active alkali content | 98.5 g/l on the Na$_2$O basis |
| sulfidity | 27.4 percent |

EXAMPLE 12 (reference)

To dissolve the melt, weak white liquor was used with a content of the total alkali of 15.5 g/l on the Na$_2$O basis. The green liquor obtained with a content of the active alkali of 41.2 g/l on the Na$_2$O basis and a sulfidity of 28.0 percent was causticized. Conditions of the causticization were maintained as in Example 10. The causticizing efficiency therewith was 81.2 percent and the white liquor contained 102.1 g/l on the Na$_2$O basis of the total alkali, 98.8 g/l on the Na$_2$O basis of the active alkali, sulfidity being 27.8 percent.

Factors for the green and white liquors obtained in Examples 10 through 12 are given in Table 3.

The data of Table 3 show that the utilization of the alkali filtrate enriched with the activated sludge hydrolysis products for the preparation of the strong white liquors permits to produce liquors that are inferior in quality to none of the liquors obtained in conventional manner.

TABLE 3

| | Green liquor factors | | | | Strong white liquor factors | | |
|---|---|---|---|---|---|---|---|
| Example No. | Total alkali content, g/l on Na$_2$O basis | Active alkali content, g/l on Na$_2$O basis | Sulfidion, % | Causticizing efficiency | Total alkali content, g/l on Na$_2$O basis | Active alkali content, g/l on Na$_2$O basis | Sulfidity, % |
| 10 | 125.2 | 42.9 | 28.2 | 80.6 | 102.2 | 98.7 | 27.9 |
| 11 | 125.2 | 43.4 | 27.7 | 80.3 | 101.8 | 98.5 | 27.4 |

TABLE 3-continued

| Example No. | Green liquor factors | | | | Strong white liquor factors | | |
|---|---|---|---|---|---|---|---|
| | Total alkali content, g/l on Na$_2$O basis | Active alkali content, g/l on Na$_2$O basis | Sulfidion, % | Causticizing efficiency | Total alkali content, g/l on Na$_2$O basis | Active alkali content, g/l on Na$_2$O basis | Sulfidity, % |
| 12 | 125.2 | 41.2 | 28.0 | 81.2 | 102.1 | 98.8 | 27.8 |

EXAMPLE 13

To the composition of fibred mass for the manufacture of cardboard, alkali mass was added obtained in the following manner.

From the sump 1, the waste activate sludge was fed into the mixer 2 where it was admixed, in a ratio of 1:1, with the residue from the primary sumps consisting of fibre bark. Immediately upon the mixing, the mixture was forwarded to the vacuum filter 3 for dewatering. The residue dewatered to a humidity of 85 percent and consisting of 43 percent by mass of the activated sludge and 57 percent by mass of fibre bark was treated with white liquor in the agitator 4. Content of the total alkali in the white liquor was 20 g/l on the Na$_2$O basis. The treatment was carried out for 20 min at a temperature of 70° C. After the alkali treatment, the reaction mixture was dewatered in the vacuum filter 5 to a humidity of 80 percent. From the alkali mass and unbleached sulfate pulp thus obtained, fibred mass was prepared for the manufacture of cardboard. The composition of the fibred mass, in percent by mass, was the following:

| unbleached sulfate pulp | 75 |
|---|---|
| alkali mass | 25 |

The fibred mass was milled to 76° SR (Schopper-Riegler scale) after which a sizing means, for example rosin size, in an amont of 6 kg per ton and a precipitant, for example alumina, in an amount of 70 kg per ton were introduced. From the fibred mass thus prepared, cardboard was manufactured having a mass of 200 g/m$^2$ and the following mechanical factors were determined: imbibing capacity, following indurance, bursting strength, and ring crush.

The cardboard produced has the following factors:

| imbibing capacity | 18 g/m$^2$ |
|---|---|
| folding indurance | 167 |
| bursting strength | 5.3 kgf/cm$^2$ |
| ring crush | 31 kgf |

EXAMPLE 14

Alkali mass was produced in the same manner as in Example 13, from the alkali mass and unbleached sulfate pulp, fibred mass was prepared of the following composition, in percent by mass:

| unbleached sulfate pulp | 70 |
|---|---|
| alkali mass | 30 |

The fibred mass was then treated as in Example 13 and cardboard was manufactured having a mass of 200 g/m$^2$. Mechanical factors of the cardboard produced were determined. These were as follows:

| imbibing capacity | 15 g/m$^2$ |
|---|---|
| folding indurance | 143 |
| bursting strength | 5.0 kgf/cm$^2$ |
| ring crush | 31 kgf |

EXAMPLE 15

Alkali mass was obtained in the manner as in Example 13. From the alkali mass and unbleached sulfate pulp, fibred mass was prepared of the following composition, in percent by mass:

| unbleached sulfate pulp | 60 |
|---|---|
| alkali mass | 40 |

The fibred mass was then treated as in Example 13 and cardboard was manufactured having a mass of 200 g/m$^2$. The cardboard obtained had the following mechanical factors:

| imbibing capacity | 16 g/m$^2$ |
|---|---|
| folding indurance | 161 |
| bursting strength | 4.7 kgf/cm$^2$ |
| ring crush | 32 kgf |

Quality factors of the cardboards manufactured according to the processes described in Examples 13–15 are given in Table 4.

Test data given in Table 4 show that the alkali mass separated from wastewater residues is fit for using in the composition of fibred mass for the manufacture of packing, construction and shoes cardboard.

EXAMPLE 16

Alkali mass was produced according to the process described in Example 13. From the alkali mass and wood mass, fibred mixture was prepared of the following composition, in percent by mass:

| wood mass | 90 |
|---|---|
| alkali mass | 10 |

The mass obtained was neutralized with sulfuric acid, paraffin emulsion was then introduced in an amount of 0.8 percent by mass, and fibred plate was then formed that further was pressed for 7 minutes at a pressure of 30 kgf/cm$^2$ and a temperature of 180° C. The wood-fibre board obtained has the following factors:

| density | 870 kg/m$^3$ |
|---|---|
| humidity | 8 percent |

-continued

| water uptake within 24 h | 16 percent |
|---|---|
| swelling in thickness within 24 h | 12 percent |
| bending strength | 530 kgf/cm² |

TABLE 4

| Example No. | Fibred mass composition | | Mechanical factors | | | | |
|---|---|---|---|---|---|---|---|
| | Unbleached sulfate pulp, % by mass | Alkali mass, % by mass | Density, g/m² | Imbibing capacity, g/m² | Folding indurance | Bursting strength | Ring crush kgf |
| 13 | 75 | 25 | 200 | 18 | 167 | 5.3 | 31 |
| 14 | 70 | 30 | 200 | 15 | 143 | 5.0 | 31 |
| 15 | 60 | 40 | 200 | 16 | 161 | 4.7 | 32 |

EXAMPLE 17

Alkali mass was obtained in the same manner as in Example 13. Plate of wood-fibre board was prepared in the following way. In to wood mass (90 percent by mass), paraffin emulsion was introduced in an amount of 0.8 percent by mass and the base of the plate was then formed after which the alkali mass previously neutralized with sulfuric acid was applied, in an amount of 10 percent by mass, as an inner layer. Pressing conditions were as follows: pressure—30 kgf/cm², temperature—180° C., duration—7 min.

The wood-fibre board obtained had the following factors:

| density | 870 kg/m³ |
|---|---|
| humidity | 8 percent |
| water uptake within 24 h | 16 percent |
| swelling in thickness within 24 h | 12 percent |
| bending strength | 500 kgf/cm² |

EXAMPLE 18

Wood mass alone was used for preparing wood-fibre board. The board was produced according to the process of Example 16. Quality factors of the board were the following:

| density | 870 kg/m³ |
|---|---|
| humidity | 8 percent |
| water uptake within 24 h | 22 percent |
| swelling within 24 h | 15 percent |
| bending strength | 350 kg/cm² |

Given in Table 5 below are quality factors of the wood-fibre board obtained in Examples 16 through 18.

TABLE 5

| Quality factors | Example No. | | |
|---|---|---|---|
| | 16 | 17 | 18 |
| Density, kg/m³ | 870 | 870 | 870 |
| Humidity, % | 8 | 8 | 8 |
| Water uptake within 24 h, % | 16 | 18 | 22 |
| Swelling in thickness within 24 h, % | 12 | 13 | 15 |
| Bending strength, kgf/cm² | 530 | 500 | 350 |

Test data show that the recovery of wastewater residues followed by utilization these in the main production process permits to obtain products of high quality.

We claim:

1. A method for recovery of wastewater residues of mixed domestic sewage and wastewater from a sulfate pulp enterprise, said sewage and waste comprising active sludge biomass, fibers and bark, wherein the sewage and wastewater are treated with an alkaline solution having a concentration of 5–80 g/l calculated as $Na_2O$ at a temperature of 20 to 70 C., said treatment hydrolyzing at least a portion of the active sludge biomass to form amino-derivatives therefrom, and the resulting reaction mixture is dewatered, the alkali filtrate so obtained containing active sludge hydrolysis products being used to dissolve a melt in the course of preparation of alkali pulping liquor, and the solid product of the dewatering being added, in an amount up to 40% by mass to a fibrous mass composition for the manufacture of cardboard or wood-fiber board.

2. A method for recovery of wastewater residues as claimed in claim 1, wherein for the alkali solution there is used white sulfate liquor.

* * * * *